Figure 1:
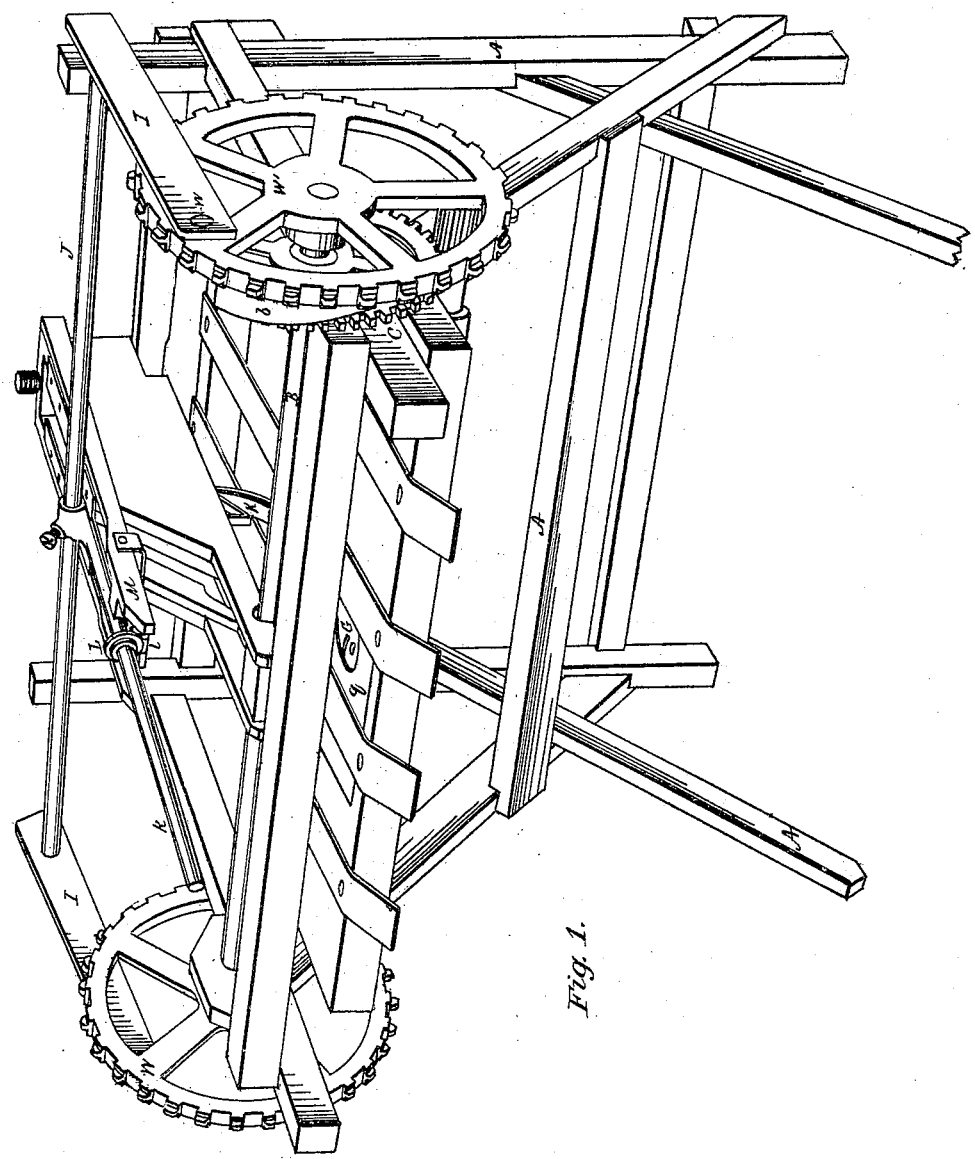

5 Sheets—Sheet 1.

E. M. THOMPSON.
GRAIN-BINDER.

No. 175,783.    Patented April 4, 1876.

Witnesses:
C. Clarence Poole
Miie H Maxon

Inventor:
Evert M. Thompson
per attys.
A. H. Evans & Co

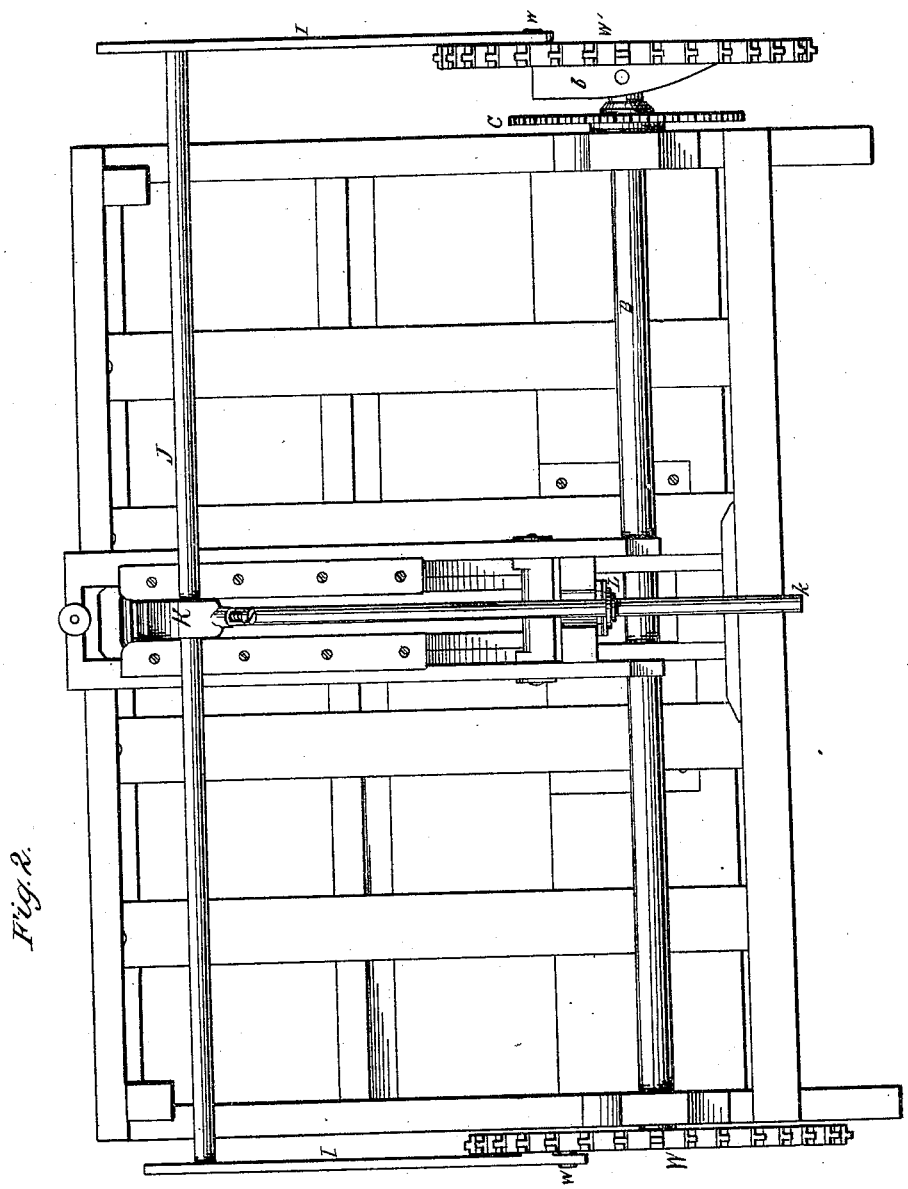

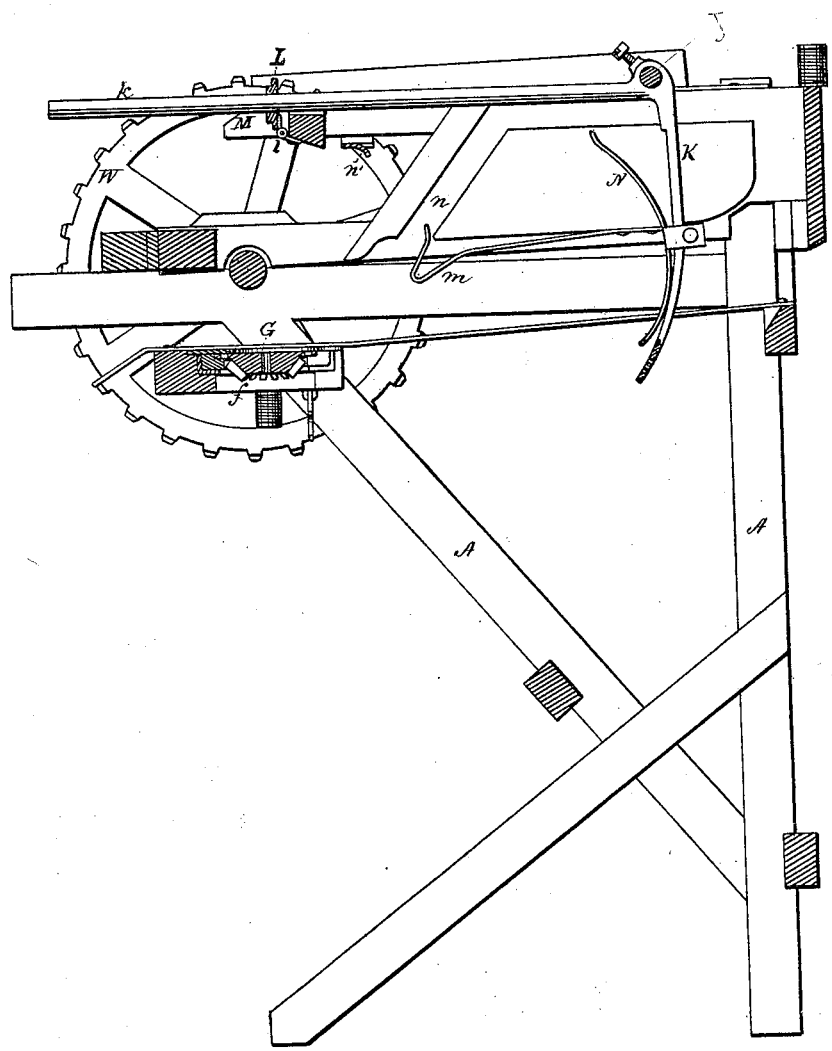

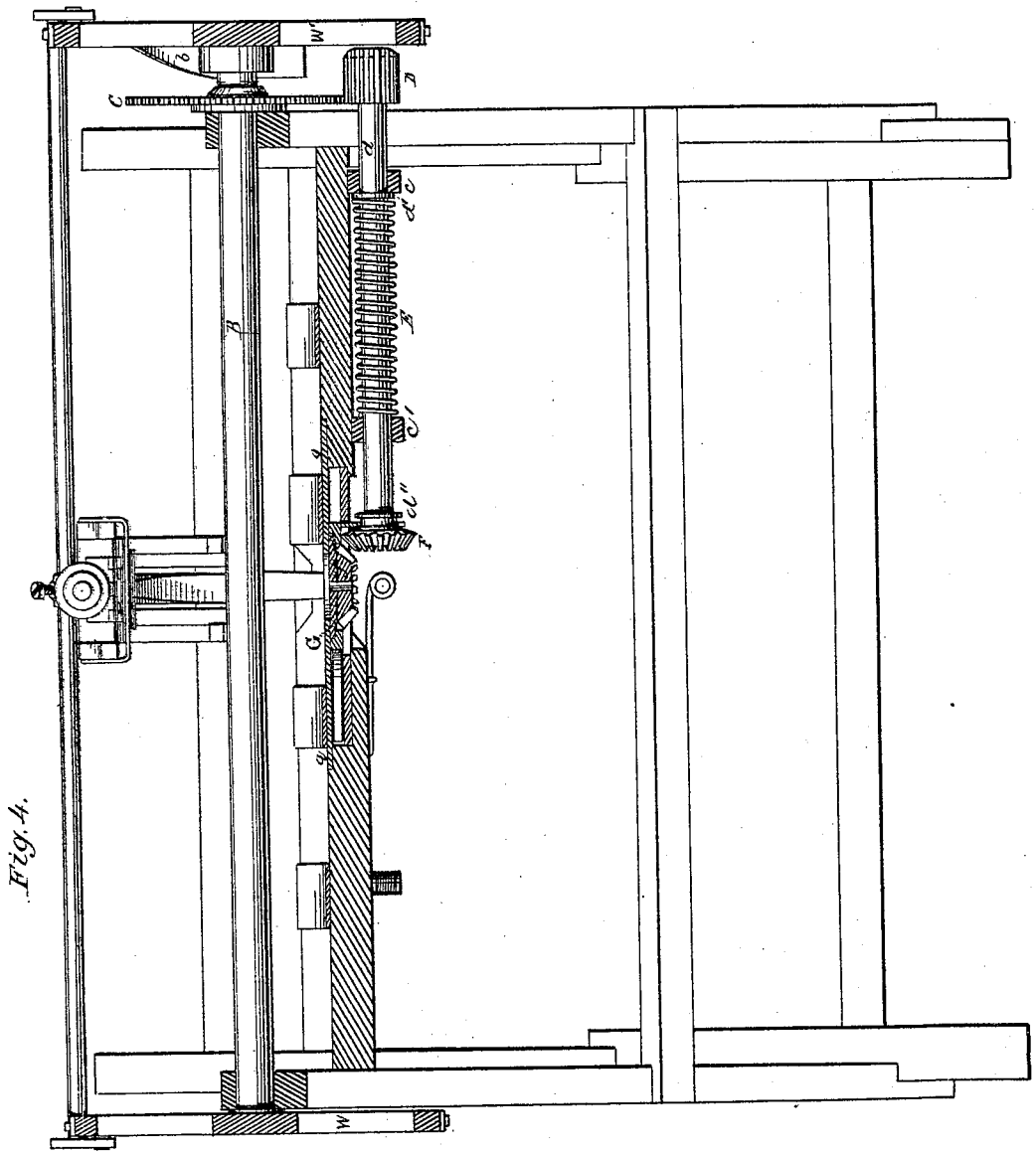

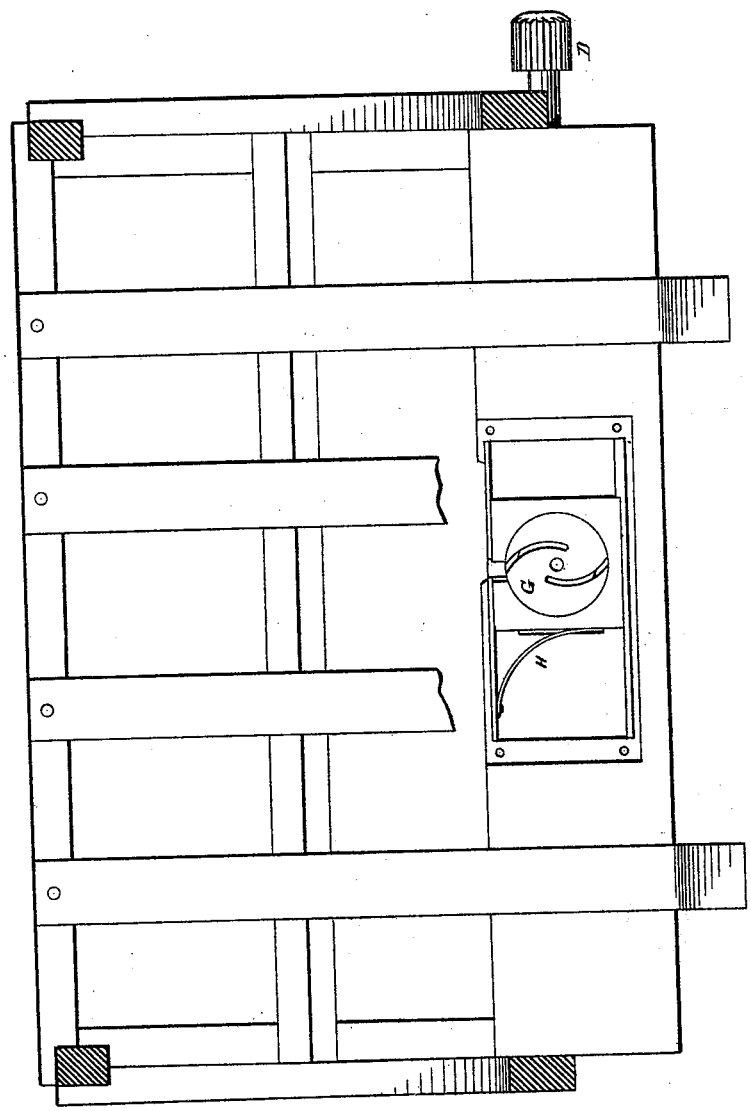

UNITED STATES PATENT OFFICE.

EVERT M. THOMPSON, OF CHICAGO, ILLINOIS.

IMPROVEMENT IN GRAIN-BINDERS.

Specification forming part of Letters Patent No. 175,783, dated April 4, 1876; application filed February 29, 1876.

*To all whom it may concern:*

Be it known that I, EVERT M. THOMPSON, of Chicago, Illinois, have invented certain new and useful Improvements in Grain-Binders, of which the following is a full, clear, and exact description, reference being had to the accompanying drawings, making a part of this specification, in which—

Figure 1 is a perspective view of my invention. Fig. 2 is a plan view of same. Fig. 3 is a vertical cross-section through $x\ x$. Fig. 4 is a vertical longitudinal section through $y\ y$. Fig. 5 is the twister and case, with guide and cutter-plate removed.

My invention relates to binding attachments for harvesters, and is an improvement on my invention for which an application for Letters Patent has been filed; and it consists in the several combinations of devices hereinafter explained and claimed.

To enable others skilled in the art to make and use my invention, I will proceed to describe the exact manner in which I have carried it out.

The frame-work A, for the support of the various operative parts of the binder, may be made partially triangular, as shown in Fig. 1; and power is applied at one or both of the wheels W W', or by any other suitable device. On the shaft B is attached the cog-wheel C, which gears with the pinion D on the short sliding shaft $d$. On the inner side of the wheel W' is secured a cam, $b$, which, at each revolution of the wheel, comes in contact with the pinion D and causes the shaft $d$ to slide in its bearings $c\ c'$, for a purpose hereinafter explained. The shaft $d$ is provided with two collars, $d'$ and $d''$, and between collars $d'$ and the bearing $c'$ is fitted the coil-spring E, which holds the collar $d'$ close against the bearing $c$, except when the shaft $d$ is forced back by the cam $b$, during the revolution of the wheel W'. On the inner or opposite end of the shaft $d$ is secured the miter F, gearing with the miter $f$, attached to the twister G whenever the sliding shaft $d$ is forced back by the cam $b$. When thus geared a revolving motion is given to the twister, and by means of the collar $c$ on the shaft $d$ the twister receives a lateral motion and the wire in the twister-slots is forced against the edge of the guide and cutting-plate $g$, and is thereby driven toward the center of the twister, out of the way of the miter F, and at a proper time and place cut off, leaving a part of the twist above and a part below the cut. Below the guide and cutter-plate is a spring, H, which drives the twister-case back to its seat after each twisting and cutting operation. This spring also holds the miter $f$ in mesh with the miter F while the cam $b$ is forcing the wire in the twister against the cutting-plate $g$. On the outer edge of the wheels W and W' are pins $w$, to which are attached the arms I, the opposite ends of these arms being secured to the cross-bar J. Loosely fitted on this cross-bar is the compressor K, having a rigidly-attached guide-arm, $k$, passing through guide-ring L, hinged at $l$ in the compressor-frame M. As the compressor moves forward to its work the cross-bar J slides upon the top of the frame M, the pivots or journals of the compressor passing horizontally below the frame; but as the compressor recedes from the twister the journals are prevented from passing below the frame, and are directed by the springs $m$ into the grooves $n\ n$, by which means the compressor K is raised above and out of the way of the grain on its return movement. To enable the compressor to rise, as its journals travel up the inclined grooves in frame M, the guide-ring L is hinged, so as to allow vertical play to the ends of the guide-arm $k$, thus permitting it to move out of a horizontal plane as the compressor rises in its return track, to avoid disturbing the grain. N is the straddler, which presses the wire against the twister when its upper end comes in contact with the stop $n'$ in the compressor-frame M.

Having thus described my invention, what I claim as my invention, and desire to secure by Letters Patent, is—

1. The compressor K, in combination with the guide-arm $k$ and frame M, substantially as and for the purpose set forth.

2. The compressor K and guide-arm $k$, in combination with the cross-bar J, arms I I, and wheels W and W', substantially as and for the purpose set forth.

3. The compressor K, cross-bar J, arms I I, and wheel W', provided with the cam $b$, substantially as and for the purpose set forth.

4. The compressor K, in combination with the grooved guides $n\ n$ and springs $m\ m$, substantially as and for the purpose set forth.

5. The compressor K, springs $m$, and guide-grooves $n$, in combination with the cross-bar J, arms I I, and wheels W W', substantially as and for the purpose set forth.

6. The straddler N, in combination with the stop $n'$, the compressor K, and twister G, substantially as and for the purpose set forth.

7. The compressor K, guide-arm $k$, and straddler N, in combination with the stop $n'$ and twister G, substantially as and for the purpose set forth.

8. The cog-wheel C and pinion D, in combination with the sliding shaft $d$ provided with the collars $d'\ d''$, spring E, miter F and $f$, and twister G, substantially as and for the purpose set forth.

9. The wheel W', provided with the cam $b$, cog-wheel C, pinion D, shaft $d$, miters F $f$, twister G, and sliding twister-case, substantially as and for the purpose set forth.

10. The twister G, provided with slots cut with particular reference to the wire striking the edge of the guide and cutting-plate, in combination with a case having a lateral motion while the twister is revolving, substantially as and for the purpose set forth.

11. The twister G, provided with slots not radial, in combination with its moving case and the guide or cutting-plate $g$, substantially as and for the purpose set forth.

12. The combination of the twister G, provided with slots not radial, with its sliding case, substantially as and for the purpose set forth.

13. The combination of the twister G, provided with slots not radial, with its sliding case, and the spring H, substantially as and for the purpose set forth.

14. The twister G, provided with slots not radial, and with a sliding case and spring H, in combination with the miters F and $f$ and the sliding shaft $d$, substantially as and for the purpose set forth.

15. The combination of the twister G, spring H, miters F and $f$, shaft $d$, wheels W W', arms I I, cross bar J, and compressor K, substantially as and for the purpose set forth.

16. The single plate-twister G, provided with slots not radial, journaled on its periphery, and having an additional bearing on its two faces, as described.

EVERT M. THOMPSON.

Witnesses:
CHAS. W. GATES,
M. E. STEVENS.